United States Patent Office 3,118,862
Patented Jan. 21, 1964

3,118,862
COPOLYMERS OF VINYL CHLOROFORMATE, WITH ACRYLONITRILE OR VINYL ACETATE
John Raymond Schaefgen, Wilmington, Del., assignor to E. I. du Pont de Nemours and Company, Wilmington, Del., a corporation of Delaware
No Drawing. Filed July 5, 1960, Ser. No. 40,502
3 Claims. (Cl. 260—77.5)

This invention relates to novel compositions of matter. More particularly it relates to novel and useful vinyl polymers, to the process for preparing such polymers, and to the shaped articles prepared therefrom.

The vinyl haloformates are formed during the pyrolysis of the bis(haloformates) of a vic-alkylene glycol. The preparation of vinyl chloformate is described in United States Patent No. 2,377,085 to F. E. Küng. Attempts to prepare high molecular weight useful polymers from the vinyl haloformates per se, particularly from vinyl chloroformate, have been unsuccessful. Treatment of the vinyl haloformates with conventional catalysts for vinyl-type polymerizations leads to low molecular weight, discolored product.

An object of this invention is to provide a high molecular weight polyvinyl haloformate.

Another object is to provide a process for preparing high molecular weight polyvinyl haloformates. A further object is to provide shaped articles of polyvinyl haloformates.

Other objects will become apparent in the course of the following specification and claims.

In accordance with the present invention a vinyl haloformate monomer is contacted with from about 0.15 to about 0.5 mole percent, based on the monomer, of an initiator selected from the group consisting of a boron trialkyl and cis-dinitrogen difluoride at a temperature less than about 50° C. and until the polymerization product has an inherent viscosity of at least about 0.5. In a preferred embodiment, the vinyl haloformate is treated at about 0° C. or below with about 0.18 mole percent of boron tri-n-butyl. The polymeric product has the recurring structural unit

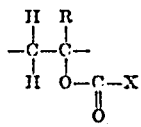

where R is a member of the class consisting of hydrogen and lower alkyl and X is halogen. By "lower alkyl" is meant an aliphatic group containing no more than about 5 carbon atoms, such as methyl, ethyl, butyl and the like. Polyvinyl chloroformate is the preferred polymer. The polymers of the class descirbed are hydrophobic, resistant to hydrolysis and do not support combustion. Furthermore, they are soluble in, e.g., acetone, forming stable solutions from which useful shaped articles are readily prepared, e.g., films by casting, coatings by spraying and filaments by spinning.

The inherent viscosity values of the polymers described in the following examples are determined conventionally in acetone solution at 0.5 weight percent concentration. The inherent viscosity ($\eta_{inh}$) is calculated as the ratio of the natural logarithm of the relative viscosity ($\eta_{rel}$) to concentration (C), where the relative viscosity is the ratio of the solution viscosity to that of the pure solvent and C is expressed in grams of polymer per 100 cc. of solution. The relationship is set forth in the following equation:

$$\eta_{inh} = \ln \frac{\eta_{rel}}{C}$$

The practice of this invention will be illustrated by the following non-limiting examples wherein parts and percentages are expressed on a weight basis unless otherwise specified.

EXAMPLE I

Vinyl Chloroformate Preparation

Vinyl chloroformate is prepared by the pyrolysis of ethylene bis(chloroformate) according to the general method of Küng (v.s.), using a 12-inch, 30 mm. diameter "Vycor" tube packed with boiling stones (Hengar granules) for the pyrolysis. The tube is heated to a thermocuple-controlled temperature of 500° C. by a pair of annular 300-watt heaters. The vertical pyrolysis tube is fitted at the bottom with a 300-ml. flask which has a side-arm leading to a water-cooled condenser which also connects to the upper end of the pyrolysis tube, thereby permitting condensable materials passing the pyrolysis tube to be returned to the flask. The more volatile materials, including the desired product, pass through the condenser to an air-cooled receiver following by two "Dry-Ice" cooled traps. Pressure in the system is maintained at 300 mm. The flask is charged with 100 cc. of ethylene bis(chloroformate) and heated to reflux temperature. As the starting material is consumed, more is added to the flask through an adapter until a total of 400 cc. has been used. About 150 cc. of material including the desired product is collected in the "Dry-Ice" cooled traps. This material is purified by distillation at 100-mm. pressure, followed by distillation through a spinning band column to yield (reproducibly) 90 g. (30%) of vinyl chloroformate boiling at 66° C. A further distillation at reduced pressure (30° C./150 mm.) yields pure vinyl chloroformate (Analysis: Cl calc'd, 33.3%; Cl found, 32.7%).

Conventional Polymerization

Vinyl chloroformate prepared as described above is subjected to several conventional vinyl polymerization conditions, as summarized in Table 1 producing low molecular weight discolored products as indicated in the table.

TABLE 1

| Catalyst | Reaction | | Polymer | | |
|---|---|---|---|---|---|
| | Time, hrs. | Temp., °C. | Yield, percent | $\eta_{inh}$ | Color |
| Azoisovaleronitrile, 0.5% [1] | 40 | 56 | 26 | 0.19 | brown. |
| Benzoin monomethyl ether, 0.5% 1-ultraviolet irradiation. | 24 | 25 | 43 | 0.26 | dark. |

[1] Weight percent, based on monomer.

Polymerization by Process of Invention

Vinyl chloroformate is polymerized in accordance with this invention by treatment at 0° C. of 10 ml. of vinyl chloroformate, as prepared above, with 0.12 mls. of a 25% solution of boron tri-n-butyl in decahydronaphthalene, i.e., a total of 0.3% initiator (0.18 mole percent). The reaction is carried out for 15 minutes at 0° C. to yield 82% of polyvinyl chloroformate of 1.03 inherent viscosity. The polymer analyzed for 32.4–32.7% chlorine, as compared with the theoretical content of 33.3%. Films cast from an acetone solution (25%) of this polymer are quite tough and are relatively insensitive to water, less than 1% hydrolysis occurring after 15 minutes in boiling water. The polymer melting temperature is 100° C.

When the above run is repeated employing 0.5% (0.3 mole percent) of initiator, the polymer yield is 78% and the inherent viscosity 0.80. When the initiator concentration is increased to 1.0% (0.6 mole percent), 68% of 0.35 inherent viscosity polymer is obtained. When the initiator concentration is increased to about 0.8% (0.5 mole percent), only low molecular weight polymer is obtained.

When the temperature is reduced to −80° C. a 99% yield of 1.78 inherent viscosity polymer is obtained using an initiator concentration of 0.3%. The X-ray diffraction pattern of this polymer shows lateral order. Films drawn 4× at 70° C., show intermediate lateral order of high perfection and intermediate orientation.

EXAMPLE II

Polyvinyl chloroformate as prepared in Example I is polymerized using 0.1% (0.2 mole percent) of cis-dinitrogen difluoride [F. H. Bauer, J.A.C.S., 69, 3104 (1949)] as the initiator, the reaction being carried out at 50° C. After 4 hours' reaction, an essentially quantitative yield of polyvinyl chloroformate of inherent viscosity as high as 1.50 is obtained.

In each of Examples III and IV, 50% acetone solution of polyvinyl chloroformate of 0.77 inherent viscosity is dry spun through a 5-hole (5 mil hole diameter) spinneret at a solution temperature of 50–55° C. into a 120° C. atmosphere, the as-spun filaments being drawn over a 0.8-inch diameter pin, under the conditions shown in Table 2.

TABLE 2

| Example | Drawing Conditions | Tenacity, g.p.d./ Elong., percent | Initial Modulus, g.p.d. | Denier |
|---|---|---|---|---|
| III | 4×/75° C | 1.0/15 | 28 | 4.1 |
| IV | 8×/80° C | 0.5/4 | 28 | 2.0 |

The fiber of Example III has a work recovery of 23% and a tensile recovery of 47 at a 3% elongation and a work recovery of 12% and a tensile recovery of 29 at a 5% elongation.

EXAMPLE V

Copolymers containing vinyl chloroformate are prepared by carrying out the polymerization in the presence of a suitable comonomer.

A solution containing equal weights of acrylonitrile and vinyl chloroformate is polymerized at 56° C. in the presence of 1% of an azo-type initiator to yield 18% of a high molecular weight copolymer containing 2.8% chlorine, i.e., 8.4% of structural units derived from vinyl chloroformate. Similar results are obtained with styrene and methyl acrylate.

A solution containing equal weights of vinyl acetate and vinyl chloroformate is polymerized at 0° C. with 0.6% of boron tri-n-butyl as catalyst to yield 70% of a high molecular weight copolymer. Thirty percent of this material is extractable in benzene, the extracted material containing 2.9% chlorine or 9% vinyl chloroformate; the unextracted material contains 23.6% chlorine or 71% vinyl chloroformate.

Vinyl chloroformate derivatives can be prepared by reacting the preformed polymer (polyvinyl chloroformate) with suitable reagents. Reaction with ammonium hydroxide yields polymer containing urethane and hydroxyl side groups, i.e., a terpolymer comprising structural units derived from vinyl chloroformate, vinyl acetate and vinyl urethane (carbamate). Reaction with gaseous ammonia leads to a vinyl chloroformate-vinyl urethane copolymer. Phenol reacts to yield a vinyl chloroformate-vinyl phenyl carbonate copolymer. Reaction with hexamethylene diamine leads to cross-linked polymer. Polyvinyl chloroformate also reacts with dimethylpiperazine, glucose, sucrose and saccharine.

EXAMPLE VI

A 0.5 mil film of polyvinyl chloroformate ($\eta_{inh}$, ca 0.8) is contacted with gaseous ammonia at room temperature for about 15 hours. The resulting film of polyvinyl urethane is hazy, drawable and rubber-like in the wet state. Fibers (3 denier per filament) drawn 4× in 40° C. water have a dry tenacity of 0.94 at an elongation of 45% and an initial modulus of 29, and a wet tenacity of 0.33 at an elongation of 117%. The initial modulus of the wet fiber is 9.

While the foregoing examples have illustrated the preparation, purification and polymerization of vinyl chloroformate and article formation from polyvinyl chloroformate, it is apparent that the other vinyl haloformates will serve equally well in these procedures. Copolymeric units may be formed from any compound containing aliphatic unsaturation and capable of polymerization upon free radical initiation. In addition to the copolymers exemplified, others may be prepared from such comonomers as methyl acrylate, methyl methacrylate, vinyl chloride and styrene in similar fashion. Indirect copolymers can be prepared from polyvinyl chloroformate by treatment with oximes and other active-hydrogen compounds in addition to those reagents disclosed and exemplified hereinabove.

Preferred among the polymers of this invention are those which contain at least about 90% by weight of structural units of the formula

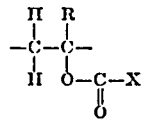

where —R and —X are as previously defined. Copolymeric units whenever present are derived from such vinyl-type comonomers as acrylonitrile, methacrylonitrile, methyl acrylate, ethylacrylate, vinyl acetate, vinyl ketones, vinyl ethers, styrene and the like. Such "direct" copolymers exhibit properties substantially the same as the corresponding homopolymer (polyvinyl haloformate) hence, in general, are equally useful materials. Additionally, the polymers of this invention may contain conventional amounts of such additives as pigments, fibers, plasticizers, anti-oxidants and the like, provided such materials are reasonably inert toward the polymer composition. Other art-recognized compositional modification also may be practical, as long as such modifications do not appreciably detract from the overall utility of the instant polymers.

Also important are the polymers comprising the above-identified structure wherein a number of the halogen (X) substituents are replaced with other groups, such as amino, alkoxy and the like, to yield vinyl haloformate derivatives. The entire haloformate grouping may be replaced, e.g., by hydroxyl upon controlled hydrolysis of the homopolymer. Halogen replacement is effected by reacting the homopolymer with a calculated amount (stoichiometrically less than the number of haloformate groups in the polymer) of ammonia, a primary or secondary amine to add groups wherein X is amino or substituted amino (i.e., a urethane group), of an alcohol to add groups wherein X is alkoxy (i.e., a mixed carbonate ester group) or of a phenol to add groups wherein X is aryloxy (also, i.e., a mixed carbonate ester group) and the like. If such reacting materials are polyfunctional, e.g., diamines, glycols and the like, cross-linked polymer results. Cross-linking may also result by reaction among dissimilar substituent groups along adjacent polymer chains. All of the halogen groups may be replaced, either with a single new substituent or variously.

The process of this invention involves treatment of vinyl haloformate in an inert solvent with a controlled amount of a selected initiator below about 50° C. Treatment with conventional initiators, such as peroxides, azo compounds and the like leads only to low molecular weight, discolored material of limited utility. When less than about 0.15 mole percent of initiator (based on the moles of monomer present) is employed, substantially no polymerization is observed to take place. When greater than about 0.5 mole percent of catalyst is employed, the polymer yield and inherent viscosity fall off, the latter falling below the limit of practical utility. However, within the indicated range of concentrations, good yields of high inherent viscosity polymer are obtained. The best yields and viscosities are obtained by using 0.15–0.20 mole percent of boron tri-n-butyl as initiator, the polymerization being carried out in bulk at about 0° C. or below. The highest molecular weight polymers are obtained by polymerization at about −80° C.

The polymers of this invention have an inherent viscosity of at least about 0.5. This assures a sufficiently high molecular weight for preparing useful shaped articles. Preferably the inherent viscosity will be about 0.8 for polymers to be converted to films, filaments and the like, in order to obtain optimum mechanical properties in the resulting articles.

The polymers described and claimed herein are surprisingly resistant to hydrolysis, with less than about 1% hydrolysis occurring after boiling films thereof for about 15 minutes. The instant polymers also are soluble in a number of organic solvents. Polyvinyl chloroformate, for example, is soluble in acetone, tetrahydrofuran, dimethylformamide, ethyl acetate, adipoyl chloride, ethylene bis-chloroformate, isophthaloyl chloride, acrylonitrile and methylene chloride. Polyvinyl chloroformate is swollen by chloroform, sebacoyl chloride, pyridine, benzene and acetic acid. The polyvinyl haloformates also are reasonably flameproof.

Articles and coatings formed from polyvinyl haloformates may be reaction-dyed to yield a more permanent coloration of such articles and coatings. Solutions of polyvinyl haloformates in polymerizable monomers, e.g., acrylonitrile, serve as supporting structures for the direct chemical spinning of shaped articles composed of the polymer derived from such monomers. Cross-linking possibilities based on the chemical reactivity of the haloformate grouping are numerous. Lower molecular weight polymers, e.g., polyurethanes, may be stabilized by "capping" the ends of the polymer chain with vinyl haloformate groups, providing thereby sites for further reaction to yield segmented copolymers. Films, fibers, coatings and the like comprising polyvinyl haloformates exhibit most of the desirable attributes normally associated with the basic vinyl composition hence are useful in many of the applications in which articles so composed commonly are employed. The dimensional and physical attributes of such articles may be enhanced to suit particular applications by incorporating suitable additives and by setting, relaxing and/or otherwise after-treating the finished articles.

Many equivalent modifications will become apparent to those skilled in the art from a reading of the above without a departure from the inventive concept.

What is claimed is:

1. A copolymer having an inherent viscosity of at least about 0.5 in acetone wherein at least 90% of the repeating units are of the formula

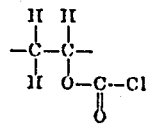

the copolymeric units constituting the minor component being formed from a member of the class consisting of acrylonitrile and vinyl acetate.

2. The copolymer of claim 1 wherein the minor component is formed from acrylonitrile.

3. The copolymer of claim 1 wherein the minor component is formed from vinyl acetate.

References Cited in the file of this patent
UNITED STATES PATENTS

| | | |
|---|---|---|
| 2,377,085 | Kung | May 29, 1945 |
| 2,440,090 | Howk et al. | Apr. 20, 1948 |
| 2,464,056 | Pechukas | Mar. 8, 1949 |
| 2,963,468 | Cleaver | Dec. 6, 1960 |

OTHER REFERENCES

Gaylord: Linear and Stereoregular Addition Polymers," Interscience, N.Y. (1956), pp. 461–463 and 528–529.